United States Patent [19]
Gargas

[11] Patent Number: 6,149,825
[45] Date of Patent: Nov. 21, 2000

[54] TUBULAR VORTEX SEPARATOR

[76] Inventor: Joseph Gargas, 6316 Wisteria La., Apollo Beach, Fla. 33572

[21] Appl. No.: 09/351,773

[22] Filed: Jul. 12, 1999

[51] Int. Cl.[7] .................................................. B01D 21/26
[52] U.S. Cl. ...................... 210/788; 210/109; 210/232; 210/512.1; 209/713; 209/719; 209/725; 209/731; 209/734; 29/890.148; 55/459.1; 55/459.4; 264/177.13; 285/133.11
[58] Field of Search ................................. 210/512.1, 788, 210/232, 109; 209/71 S, 719, 725, 731, 734; 55/459.1, 459.2, 459.3, 459.4, 459.5; 29/890.148, 890.14; 264/177.13; 285/133.11

[56] References Cited

U.S. PATENT DOCUMENTS 2,709,397  5/1955  Banning .............................. 210/512.1
3,802,570  4/1974  Dehne ................................. 210/512.1

*Primary Examiner*—David A. Reifsnyder
*Attorney, Agent, or Firm*—Penderoff & Cutliff

[57] ABSTRACT

A tubular vortex separator which can be used to separate particulate matter of higher density from fluids. In a preferred embodiment, the vortex separator is generally tubular, simple in design, and economical to produce.

20 Claims, 2 Drawing Sheets

TUBULAR VORTEX SEPARATOR

BACKGROUND OF THE INVENTION

1. Field of the Invention

The present invention concerns a tubular vortex separator which can be used to separate particulate matter of higher density from fluids. In a preferred embodiment of the invention, the vortex separator is simple in design and economical to produce.

2. Description of the Related Art

Mechanical filters, such as charcoal filters, diatomaceous earth filters, sand filters, or paper cartridge filters, have traditionally been used as the main filters for swimming pools and the like, but suffer the disadvantage that they are rapidly clogged with particulate matter and thus need to be cleaned at frequent intervals. A vortex separator placed upstream of such a filter can remove most particulate matter from a fluid stream, thereby greatly extending the interval at which the downstream filter must be cleaned. Thus, the vortex separator assumes the role of the main filter, reducing the role of the previously main filter to a final polishing filter, and in some cases is even eliminating it entirely.

A vortex separator separates materials of different density from a fluid, which fluid may be a gas or a liquid. A vortex separator operates by creating a rapid vortex within a chamber having annular walls. The vortex may be created by stirrer blades within the chamber, or by introducing a fluid into a chamber tangentially so as to create a rapid vortex within the chamber. It is the centrifugal force created by the vortex that causes dense particles entrained in the fluid to move toward the outside of the vortex, then down along the walls to the bottom of the vortex chamber. Fluid in the center of the vortex tends to be particle free and can be removed.

One such filter, referred to as a cyclone separator, is described in U.S. Pat. No. 3,802,570 (Dehne). This filter however has a complex design, comprising pipes of many diameters and shapes, and comprising both tubular and conical sections. There is a need for a filter having a simpler design, yet adequate effectiveness.

Another suitable vortex particle separator of conventional design is described in U.S. Pat. No. 3,907,686 (Fletcher et al.). The separator removes particulate matter of greater density than the water by centrifugal action. The fluid input to the separator is provided at its upper end by an inlet which opens tangentially into a cylindrical-shaped upper chamber, thus causing swirling of the fluid within the chamber. Below the chamber is a conical chamber which terminates at a lower opening. The lower opening is the entrance to a trap or pot where particulate which has been separated from the fluid is accumulated and prevented from reentering the normal flow of fluid. As fluid enters the upper chamber a vorticular motion is induced in the fluid, creating centrifugal forces which cause those particles which are heavier than water to move toward the outside wall of the upper chamber. The lighter fluid remains in the center of the chamber and can be withdrawn. The particulate matter slides down along the walls and eventually goes through the entrance and into the trap.

Further examples of vortex separators are described in U.S. Pat. No. 4,306,521 (Giles), U.S. Pat. No. 4,412,919 (Ueda), U.S. Pat. No. 5,599,365 (Alday et al.), and U.S. Pat. No. 5,879,545 (Antoun).

While vortex separators as described in the above listed patents are satisfactory in operability, they are complex in design and thus uneconomical to produce. Perhaps vortex separators would be more widely used if they could be produced in a more economical manner.

SUMMARY OF THE INVENTION

It is an object of the invention to provide a vortex separator that is simple in design and is highly effective.

It is a further object of the present invention to design a vortex separator which can be assembled from easily obtained, conventional plumbing components, thereby reducing the construction cost.

In the present invention, the vortex separator is preferably a generally tubular element comprising an elongated sideways "T-junction". The T-junction comprises first and second coaxial longitudinal arms which, in use, will be oriented vertically, and one perpendicular feed arm which, in use, will be oriented horizontally. In the simplest embodiment, the three arms of the T-junction have approximately the same diameter, with at least the first or lower longitudinal arm, measured from the center of the T junction to the end of the arm, having a length of at least three times, more preferably from four to six times, it's diameter.

Such a vortex separator can be easily constructed from piping materials, preferably PVC piping, as conventionally used in swimming pool construction. Beginning with a conventional 2 inch T-junction, pipes are inserted into the opposite sides of the coaxial arms of the T-junction. This elongate section becomes the longitudinal section of the junction, which is oriented vertically in operation.

At least one half of the inlet between the horizontal or perpendicular arm and the vertical channel formed by the two longitudinal arms is blocked so as to provide a tangential inlet. That is, water from the feed arm enters the vertical channel along the annular wall, smoothly follows the wall, and is thus immediately brought into a vorticular motion.

This blocking is most easily accomplished by taking a section of pipe having an outer diameter which is the same as or slightly larger than the internal diameter of the T-junction, cutting about a three inch long section in the case of a two inch internal diameter T-junction, and cutting this section in half lengthwise so as to make two equal sections, each being arcs describing 180 degrees. One of these sections is then introduced into the longitudinal section of the T-junction in a manner so as to block at least 50%, more preferably about 75%, most preferably about 85–90% of the opening between the perpendicular arm and the longitudinal channel of the T-junction. As a result, fluid flowing from the perpendicular arm into the longitudinal channel of the T-junction enters tangentially, thereby imparting a swirling vortex flow pattern to the water inside the longitudinal channel of the T-junction.

Since the longitudinal channel of the T-junction is oriented vertically, particulate matter tends to be forced to the outside wall of the longitudinal channel and drops down the first or lower longitudinal arm of the T-junction, to be collected in a trap or pot connected to the bottom of the lower longitudinal arm, where it is collected and later removed. Water which tends to be free of particulate flows upwards and moves to the next section of the water treatment system.

In the Northern Hemisphere it is preferred that the vortex generator is so designed that (looking down) the water enters on the left side of the T-junction, thereby giving it a clockwise spin. South of the Equator it is preferred that the water enters to the right, which will give the vortex a counter-clockwise spin. This results in the vortex being aided by, rather than fighting against, the Coriolis force.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a fuller understanding of the nature and objects of the present invention reference should be made by the following detailed description taken in with the accompanying drawings in which:

FIG. 1b is a top view of the vortex separator of FIG. 3a; and

DETAILED DESCRIPTION OF THE INVENTION

Figure 1A:
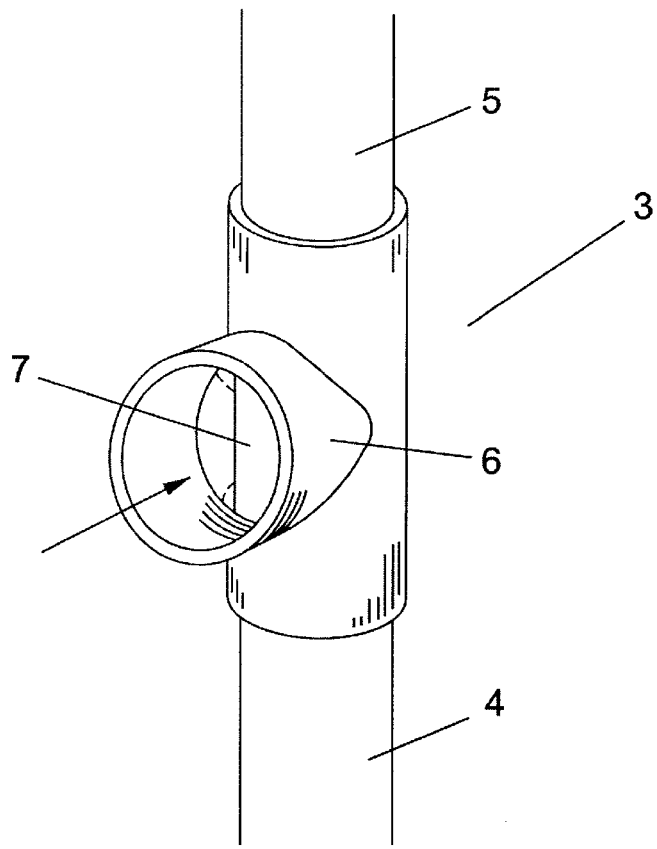
FIG. 1a is a close-up perspective view of the tubular vortex separator for separation of solids from water.
Figure 1B:
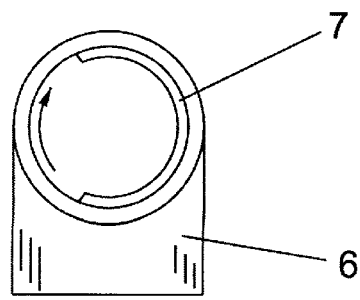
Figure 2:
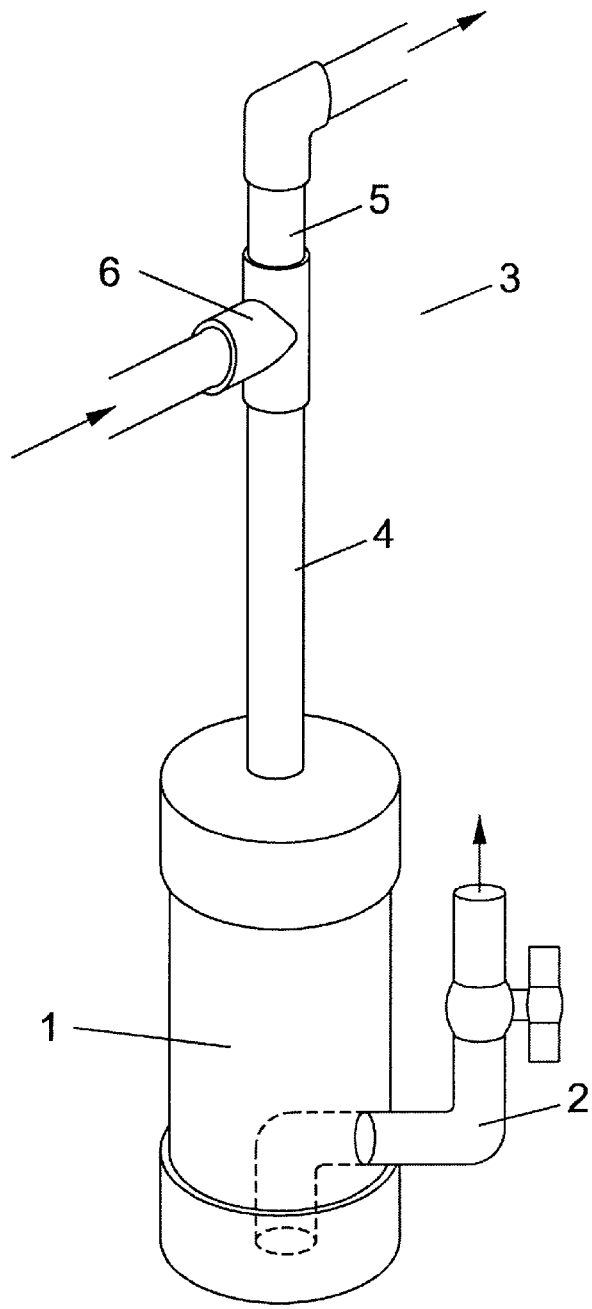
FIG. 2 is a perspective view of the tubular vortex separator of FIG. 1 connected to a collection chamber.

The present invention concerns a vortex separator as conventionally provided prior to or in place of an adsorption filter. The separator is used to separate out particulates from a water stream. When used in combination with a filter, the vortex separator removes particulates before the water reaches the filter, thereby cutting down on the loading of the filter and accordingly not only reducing the size requirement of the filter, but also extending the interval between filter changes and extends the life of the filter by removing grit and abrasive particles such as sand before they reach the filter.

The vortex separator is simpler in design than conventional vortex or cyclone separators, and may even be assembled from easily obtained, conventional plumbing components, thereby reducing the cost of construction.

The vortex separator may be constructed of any material which resists oxidation by ozone, and for reasons of wide availability and low cost is preferably constructed of PVC piping and fittings.

The inventive vortex separator will now be described in greater detail by reference to the illustrative embodiment shown in the figures. This vortex separator is designed for treating, e.g., swimming pool water, hot tub water, aquatic mammal tank water, or fountain water with sizes of 1900 liters (500 gallons) on up.

Water is drawn from a source and is pumped horizontally into vortex separator 3. The vortex separator is a generally tubular element comprising an elongated sideways T-junction. The T-junction comprises first 4 and second 5 vertical coaxial longitudinal arms and one horizontal perpendicular feed arm 6. The three arms have approximately the same internal diameter, with the first or lower longitudinal arm, measured from the center of the "T" junction to the end of the arm, having a length of six times it's diameter. As the internal diameter is 2 inches, the length of the lower arm is 12 inches. The lower arm terminates in a collection chamber 1, which fills with collected matter and can be easily cleaned by draining through outlet pipe 2 which has an opening just over the floor of the collection chamber 1.

The water with entrained particulate matter travels through the horizontal tangential T-junction arm 6 which opens into a vertical column. At least one half of the inlet between the horizontal or perpendicular arm and the vertical channel formed by the two longitudinal arms is blocked so as to provide a tangential inlet. That is, water from the feed arm enters the vertical channel along an annular wall, smoothly follows the wall, and is thus immediately brought into a vorticular motion.

This blocking is most easily accomplished by taking a section of pipe having an outer diameter which is the same as or slightly larger than the internal diameter of the T-junction, cutting about a three inch long section in the case of a two inch internal diameter T-junction, and cutting this section in half lengthwise so as to make two equal sections, each being arcs describing 180 degrees. One of these sections is then introduced into the longitudinal column of the T-junction and cemented in place in a manner so as to form a gate 7 blocking at least 50%, more preferably about 75%, most preferably about 85–90% of the opening between the perpendicular arm 6 and the longitudinal channel 4, 5 of the T-junction. The abrupt size reduction between the 2 inch diameter of the perpendicular pipe 5 and the inlet adjacent to the gate 7 allows for higher velocity of water, and the contour shape of the longitudinal channel within the T-junction aids in the flow and efficiency of the centrifuge that is produced, thus more particles will be removed by being forced against the annular internal side wall. Particles as small as 20 to 50 microns can be removed through this process.

Preferably, at least the leading longitudinal edge of the gate 7 is beveled or tapered so as to minimize turbulence as the water as it passes along the inner wall of the T-junction and swirls over the gate 7. Water flowing from the perpendicular arm 6 into the longitudinal channel 4, 5 of the T-junction thus enters tangentially, thereby imparting a swirling vortex flow pattern to the water inside the longitudinal channel of the T-junction.

Since the 2 inch T-junction is designed to receive and join three pipes having internal diameters of 2 inches, it is of necessity larger in inner (and outer) diameter than 2 inches. Since in the preferred embodiment of the invention the gate 7 is made of the same 2 inch piping used in constructing the vortex separator, insertion of the gate 7 into the T-junction results in an internal dimension which is similar to the internal diameter of the 2 inch piping.

In the Northern Hemisphere it is preferred that the vortex generator is so designed that (looking down) the water enters on the left side of the T-junction, thereby giving it a clockwise spin. South of the Equator it is preferred that the water enters to the right, which will give the vortex a counter-clockwise spin. This results in the vortex being aided by, rather than fighting against, the Coriolis force.

Since the longitudinal channel of the T-junction is oriented vertically and the vortex swirls about a vertical axis, particulate matter tends to be forced to the outside wall of the vertical longitudinal channel. Particulate matter drops down along the first or lower longitudinal arm 4 of the T-junction, to be collected in a trap or collection chamber 1 connected to the bottom of the lower longitudinal arm, where it is collected and later removed through drain pipe 2. Water which tends to be free of particulate, after swirling, flows upwards and moves to the next section of the water treatment system.

Collection chamber 1 which serves as the waste collection chamber is no less than 4 inches in diameter, and may be as wide as 8 inches. The minimum height of this waste collection chamber 1 must be no less than 12 inches to avoid the likelihood of particulate mater becoming re-entrained in the water flow and exiting the column of water.

The bottom of the waste collection chamber is connected to a discharge pipe 2 of no less than 1 inch and no greater than 3 inches diameter, which is selectively opened and closed via a valve. This valve can be opened manually or through a solenoid periodically to flush the debris that is collected in waste collection chamber 1. During operation there is preferably no more than a 3 to 5 lb. pressure drop on the exit side of the waste collection chamber 1 in comparison to the entrance side of the centrifuge, as the difference in pressure aids in the formation of the vortex. That is, too great a pressure drop results in too rapid a longitudinal flow through the pipe and insufficient vorticular movement, and too small a pressure drop results in insufficient longitudinal and vorticular movement.

In the context of a swimming pool water treatment system, the vortex separator will remove the particulate matter that is responsible for clogging the main filter and increasing the chlorine demand, as the biodegradable substances are actually removed from the water column and end up in the collection pot due to their weight and size. This early removal of particulates will also protect the main filter against sharp objects such as gravel and grains of sand, which tend to tear or wear the cloth or laterals on a filter when they are thrust against it by the water flow. The vortex will also remove undissolved calcium in the water that tends to cause a problem with scaling, this again being done through the process of a centrifugation. Any sand present will also be removed and kept out of the system. This represents an improvement over the conventional filter, as sand readily re-enters the pool due to its weight when the regular pool filter is removed for cleaning the sand grains just fall off as the filter is being lifted out of the filter housing and the grains of sand just recirculate back into the pool when the pump is reactivated—the process is repeated and the filter will continually suffer wear and tear due to this.

The centrifuge will eliminate the need to clean the regular pool filter which now will act as a final water polishing filter and in normal use will need only to be rinsed out once or twice a season. This is attributable to the centrifuge removing all the heavy debris along with the biodegradable substances, thus there will be a negligible pressure drop on the regular pool filter over time, allowing a much longer run time before servicing (cleaning). The centrifuge will also be invaluable in new pool installation were sand and heavy debris—that can destroy filter cartridges—will be completely be removed in this process.

Although this invention has been described in its preferred form with a certain degree of particularity with respect to a swimming pool water purification system, it is understood that the present disclosure of the preferred form has been made only by way of example, and that numerous changes in the details of structures and composition of the product may be resorted to without departing from the spirit and scope of the invention.

What is claimed is:

1. A method for separating from water particles having a density greater than water, said method comprising:

providing a tubular vertical vortex separator which is generally tubular in construction and comprises an elongated sideways "T" junction including an upwardly directed vertically oriented longitudinal arm, a downwardly directed vertically oriented arm coaxial with the upwardly directed longitudinal arm, and a perpendicular horizontal feed arm, wherein said upwardly directed arm and said downwardly directed arm in combination define a vertical column, wherein said downwardly directed longitudinal arm, measured from the center axis of the horizontal longitudinal arm to the bottom end of said downwardly directed longitudinal arm is from three to ten times the internal diameter of said downwardly directed longitudinal arm, wherein said bottom end of said downwardly directed arm terminates in a collection chamber of greater diameter than said downwardly directed longitudinal arm, and wherein at least one half of the inlet between the horizontal perpendicular arm and the longitudinal arms is blocked so as to provide a tangential inlet to said longitudinal column; and introducing water with entrained particles from said perpendicular horizontal feed arm tangentially into said vertical column formed within the tubular vertical vortex separator with sufficient velocity to cause vorticular swirling of said water within said column, downward precipitation of said particulate matter, and upward movement of particulate free water.

2. A method as in claim 1, wherein said upper and lower arms have approximately the same internal diameter.

3. A method as in claim 1, wherein the length of said downwardly directed longitudinal arm is from three to six times the internal diameter of said downwardly directed longitudinal arm.

4. A method as in claim 1, wherein said vortex separator is made of plastic.

5. A method as in claim 4, wherein said plastic is polyvinyl chloride.

6. A method as in claim 1, wherein from 75 to 95% of said inlet is blocked.

7. A method as in claim 1, wherein from 80 to 90% of said inlet is blocked.

8. A method as in claim 1, wherein the pressure drop between said vortex separator inlet and outlet is from 3 to 5 pounds per square inch.

9. A method as in claim 1, wherein said longitudinal and feed arms have a diameter of from 1 to 3 inches.

10. A method as in claim 1, wherein the velocity of water flowing through the opening between the horizontal feed arm and the longitudinal arms is at least three times the velocity of the water flowing through said feed pipe.

11. A method for forming a tubular vortex separator, said method comprising:

providing a "T" junction including a first longitudinal tubular arm, a second longitudinal tubular arm coaxial with said first longitudinal tubular arm, and a tubular feed arm perpendicular to and in communication with said first and second longitudinal tubular arms, wherein said first and second longitudinal tubular arms in combination define a column, wherein at least said second longitudinal arm, measured from the center axis of the feed arm to the end of said second longitudinal arm is from three to ten times the internal diameter of said second longitudinal arm, introducing, within said column, a tubular section having an external diameter corresponding to said column internal diameter, having a radius of from 30° to 270°, having a length greater than the feed arm internal diameter, and closing off at least 50% of the junction between said feed arm and said column, and providing at the end of said second longitudinal arm a collection chamber comprising a pipe of greater diameter than said second longitudinal arm.

12. A method as in claim 11, wherein the diameter of said collection chamber is at least twice that of said second longitudinal arm.

13. A method as in claim 11, wherein said collection chamber is provided with a discharge pipe for discharging debris collected in the bottom of said collection chamber.

14. A method as in claim 13, wherein said discharge pipe is provided with a manually operated valve for periodically opening said discharge valve to flush debris from said collection chamber.

15. A method as in claim 13, wherein said discharge pipe is provided with a solenoid valve and with a control means for periodically opening said solenoid valve to flush debris from said collection chamber.

16. A method as in claim 11, wherein said tubular section closes off at least 75% of the junction between said feed arm and said column.

17. A method as in claim 11, wherein said tubular section closes off from 85 to 90% of the junction between said feed arm and said columns.

18. A method as in claim 11, wherein said collection chamber is at least 12 inches in length.

19. A method as in claim 11, wherein said tubular section comprises a linear longitudinal leading edge, a linear longitudinal trailing edge, and arcuate transverse edges, and wherein said leading longitudinal edge is tapered.

20. A method as in claim 19, wherein said trailing longitudinal edge is tapered.

* * * * *